Figure 3:
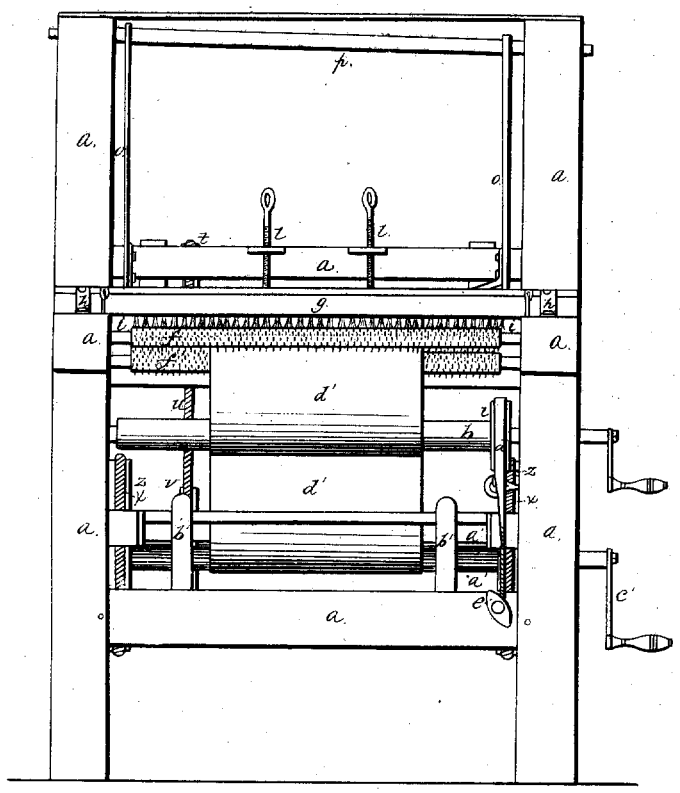

763X
Sheet 1. 2 Sheets.
R. Dorr.
Cloth Shearing Mach.
Patented May 8, 1807.
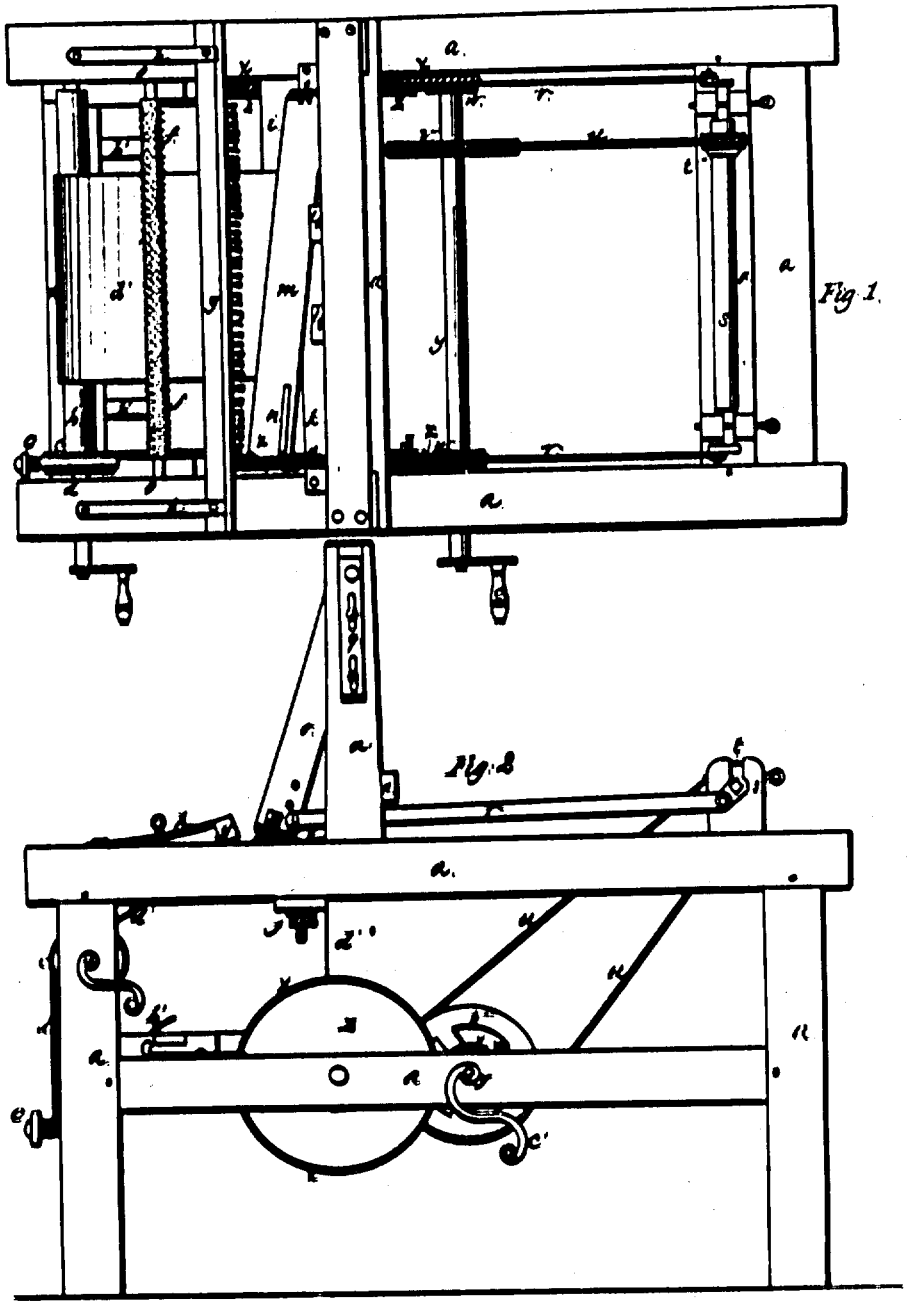

763X

Sheet 2-2 Sheets.

R. Dorr.

Cloth Shearing Mach.

Patented May 8, 1807.

N. PETERS, PHOTO-LITHOGRAPHER, WASHINGTON, D. C.

763X

Reuffel Dorr May 8, 1807
Letters Patent

The Schedule referred to in these Letters Patent and making part of the same containing a description in the words of the said Reuffel Dorr himself of a Machine for Shearing cloth This machine consists of an exterior frame which supports the acting machinery, several rollers which aid the progress of the cloth under the shears and whirls or wheels for communicating motion. a Brush for raising the nap previous to its coming under the shear: A cushion which lifts the cloth to the level of the shears. A bed shear and a flying or moveable shear. The frame in which the latter hangs, and the crank axis & bars or arms which move the flying shear. In particularly describing these several parts of the machine I will use the natural order in which they succeed each other in the operation of shearing, so far as is practicable and consistent with brevity. The exterior frame is constructed of wood or other proper material elevated on feet high enough to allow space for the revolution of the whirls or wheels used in this machine. The frame is so wide as to allow cloth of any required width to pass along within it. The horizontal sides support the axis of the several moving powers. and near the centre is an upright post connected at top in which hangs the frame of the flying shear. Near one extremity of this frame rests the beam on which the cloth to be shorn is rolled by means of a crank on the axis at one end thereof. On the same end of the axis is fixed a wheel round which passes a strap that can be tightened at pleasure by means of a screw. to oppose resistance enough and stretch the cloth as it passes from the beam to the shears. Being drawn from this beam. the cloth passes between two rollers covered with card teeth. and as these teeth are in a contrary direction to the motion of the cloth. they oppose a uniform & gentle

763X gentle resistance to its progress. causing it to pass to the shears
with a regular motion. A brush hung on springs bears or
presses on the cloth. after it has passed the last mentioned rol-
lers with sufficient force to raise the nap. and prepare it for
cutting. Arriving at the shears the cloth passes over what is
termed a cushion which bears it up against the underside of
the bed shear. This cushion is elevated or depressed by screws
so as to elevate the cloth & nap to be cut by the shears according
to the kind of cloth to be shorn. Having been shorn on its pas
sage over this cushion. the cloth is carried to two cylindric
rollers. between which it is drawn forward. In order to effect
this object these rollers are made to move in contrary directions
and pressed together by means of springs which allow the high-
est roller to rise and accommodate the space between the
rollers to the thickness of the cloth. The rate of the motion of these
rollers & the progress of the cloth passing between them is determined
by the proportions wch their diameters bear to the diameters of
the wheels or whirls to which they are connected and by which
they are moved. The main shaft or principle axis is placed
near the centre of the frame and under the shears. it is turned
by water, Horses, or any proper and convenient moving force. On the
opposite ends of this axis. are two small whirls which by straps
or teeth give motion to the larger whirls or wheels which turn
the cylindric rollers above mentioned. There is also on one end
of this shaft a large wheel or whirl which communicates mo-
tion by a strap or band to the crank axis by means of a small
whirl at one end thereof. The operation of Shearing and the con-
struction of the parts connected therewith I shall next describe.
The <u>Bed-Shear</u> lies in an horizontal position resting with its
ends on the frame; it is fixed by means of screws and having a
transverse slit or groove at each end may be advanced to the
proper cutting position as the edge of the shear is worn by grind-
ing or other causes. And to prevent any vibrating or rising one
turn

7637

[illegible] on this shear it may be regulated & kept down by screws
pressing on it from an upper frame. The flying or moving shear
the edge of which traverses and cuts against the bed shear at
their advancing point of contact is also in nearly a horizontal posi-
tion; the ends resting on pivots which allow the edge of the shear
to rise or fall as may be necessary in the act of cutting. To the heel
end of this shear is attached a spring which keeps the edge of
the flying shear to that of the bed shear at the place of contact
during the progress of the cut. besides keeping a regular pressure
at the point of contact of the shears. This spring prevents the wear
& regulates the stroke to any casual unevenness in the bed shear.
The flying shear is suspended by bars or in a hanging frame
from a connecting bar at the ends of which are pivots which rest
in sliding boxes in the upright exterior frame & may be adjus-
ted by screws and elevate the suspending frame & flying shear
to the proper position for cutting against the edge of the bed shear.
This frame & flying shear has an oscillating or pendulum like
motion when in the act of cutting. being drawn forward by the
bars or arms communicating with the crank axis. In the
suspending bar at the point end of the shear there is also a spring
which depresses the point of the shear to the proper cutting position
after one cut has been made & preparatory to the next. The direc-
tion of the edge of the flying shear varying from the direction of
the edge of the bed shear and forming an acute angle there
with cuts in succession from the heel to the point of the shears
as the place of contact advances in the same manner as other
shears act. The crank axis by means of which the flying
shear is drawn forward & carried back in the act of shearing
has a small wheel on one end by which it receives motion
from the large wheel on the main or principle axis. Two bars
or arms extending from the cranks on this axis to the bottom of
the suspending bar of the flying shear frame give motion to
the flying shear & make the cut. The revolutions of this axis
and

7634 and consequent number of cuts by the shears in any given distance
of the cloth in its progress over the cushion, will depend on the
proportion of the diameter of the large wheel or whirl on the
principle axis to the diameter of the whirl on the crank axis
and by having whirls of different sizes or increasing their num-
ber, the number of cuts may be adapted to the nature of the work
to be performed Witnesses
Nicholas Hoing
Seneca Dorr Rufsel Dorr

[illegible] (Patented May 8th 1818.) ([illegible])